(12) United States Patent
Tang et al.

(10) Patent No.: US 10,308,818 B2
(45) Date of Patent: Jun. 4, 2019

(54) ARTICLE HAVING COATING WITH GLASS, OXYGEN SCAVENGER, AND METAL

(71) Applicant: United Technologies Corporation, Farmington, CT (US)

(72) Inventors: Xia Tang, West Hartford, CT (US); David C. Jarmon, Kensington, CT (US); Paul Sheedy, Bolton, CT (US); Virginia H. Faustino, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 15/158,640

(22) Filed: May 19, 2016

(65) Prior Publication Data

US 2017/0335118 A1 Nov. 23, 2017

(51) Int. Cl.
| | |
|---|---|
| *B32B 15/04* | (2006.01) |
| *B32B 17/06* | (2006.01) |
| *C09D 5/08* | (2006.01) |
| *B01J 20/02* | (2006.01) |
| *B01J 20/10* | (2006.01) |
| *C03C 17/02* | (2006.01) |
| *C23C 24/08* | (2006.01) |
| *C23C 30/00* | (2006.01) |

(52) U.S. Cl.
CPC .............. *C09D 5/084* (2013.01); *B01J 20/02* (2013.01); *B01J 20/0218* (2013.01); *B01J 20/10* (2013.01); *C03C 17/02* (2013.01); *C23C 24/08* (2013.01); *C23C 30/00* (2013.01)

(58) Field of Classification Search
USPC ................................ 428/426, 428, 432, 688
See application file for complete search history.

(56) References Cited

U.S. PATENT DOCUMENTS

| | | | | |
|---|---|---|---|---|
| 3,027,330 A | * | 3/1962 | Schrewelius | ........... C04B 35/14 |
| | | | | 136/201 |
| 3,503,801 A | * | 3/1970 | Huang | .................... C23C 30/00 |
| | | | | 252/507 |
| 4,039,997 A | * | 8/1977 | Huang | ............... H01C 17/0656 |
| | | | | 252/520.2 |
| 4,889,776 A | | 12/1989 | Priceman | |
| 4,909,984 A | * | 3/1990 | Singheiser | .............. C23C 30/00 |
| | | | | 420/443 |
| 5,472,487 A | | 12/1995 | Chin et al. | |
| 5,693,156 A | | 12/1997 | Berczik | |
| 6,042,898 A | * | 3/2000 | Burns | ................... C23C 14/022 |
| | | | | 427/534 |

(Continued)

FOREIGN PATENT DOCUMENTS

| | | |
|---|---|---|
| EP | 1479657 | 11/2004 |
| EP | 1925694 | 5/2008 |

OTHER PUBLICATIONS

European Search Report for European Patent Application No. 17171899 completed Sep. 15, 2017.

*Primary Examiner* — Lauren R Colgan
(74) *Attorney, Agent, or Firm* — Carlson, Gaskey & Olds, P.C.

(57) ABSTRACT

An article comprising a substrate and at least one coating layer disposed on the substrate. The coating layer includes a silicate glass matrix, an oxygen scavenger phase dispersed through the silicate glass matrix, and at least one metal in metallic form.

17 Claims, 2 Drawing Sheets

(56) References Cited

U.S. PATENT DOCUMENTS

| | | | |
|---|---|---|---|
| 6,733,907 B2 | 5/2004 | Morrison et al. | |
| 7,005,191 B2 | 2/2006 | Perepezko et al. | |
| 7,951,459 B2* | 5/2011 | Tang | C04B 41/009 416/241 B |
| 8,147,928 B2* | 4/2012 | Ulion | C23C 14/0688 427/596 |
| 8,247,085 B2* | 8/2012 | Bewlay | B32B 15/01 416/241 B |
| 9,511,572 B2* | 12/2016 | Cheruvu | B32B 33/00 |
| 2004/0219295 A1* | 11/2004 | Perepezko | C23C 26/00 427/255.27 |
| 2011/0240911 A1 | 10/2011 | Sundberg et al. | |
| 2013/0157064 A1* | 6/2013 | Perepezko | C04B 41/86 428/427 |
| 2015/0315390 A1* | 11/2015 | Endres | B05D 5/08 428/34.6 |

\* cited by examiner

ARTICLE HAVING COATING WITH GLASS, OXYGEN SCAVENGER, AND METAL

BACKGROUND

Aerospace vehicles, engines, and other devices and machines often operate under severely elevated temperature conditions. Components that are exposed to the elevated temperatures can be formed of temperature-resistant metal alloys and ceramic materials. Despite the use of temperature-resistant materials, such components may remain susceptible to environmental degradation from oxidation, erosion, radiation, or the like. Barrier coatings may be used to enhance environmental protection.

SUMMARY

An article according to an example of the present disclosure includes a substrate and at least one coating layer disposed on the substrate. The coating layer includes a silicate glass matrix, an oxygen scavenger phase dispersed through the silicate glass matrix, and at least one metal in metallic form.

In a further embodiment of any of the foregoing embodiments, the oxygen scavenger phase includes molybdenum disilicide.

In a further embodiment of any of the foregoing embodiments, the oxygen scavenger phase includes at least one boride or silicide of an element selected from the group consisting of aluminum, tantalum, tungsten, platinum, nickel, cobalt, vanadium, niobium, rhenium, rhodium, indium, iridium, chromium, titanium, hafnium, zirconium, yttrium, and combinations thereof.

In a further embodiment of any of the foregoing embodiments, the at least one metal is selected from the group consisting of copper, aluminum, silver, nickel, and combinations thereof.

In a further embodiment of any of the foregoing embodiments, the at least one metal is selected from the group consisting of platinum, silicon, cobalt, niobium, molybdenum, tantalum, tungsten, rhenium, titanium, vanadium, chromium, zirconium, hafnium, ruthenium, rhodium, indium, osmium, iridium, and combinations thereof.

In a further embodiment of any of the foregoing embodiments, the at least one coating layer includes a first coating layer and a different, second coating layer that is located between the first coating layer and the substrate. The first coating layer includes the silicate glass matrix and the oxygen scavenger phase, and the second coating layer includes the at least one metal.

In a further embodiment of any of the foregoing embodiments, the second coating layer includes a matrix. The metal is dispersed through the matrix.

In a further embodiment of any of the foregoing embodiments, the metal includes multiple different metals.

In a further embodiment of any of the foregoing embodiments, the at least one coating layer includes a third coating layer that is located between the second coating layer and the substrate. The third coating layer includes silicate glass.

In a further embodiment of any of the foregoing embodiments, the second coating layer, in addition to the at least one metal phase, includes a reinforcement phase.

In a further embodiment of any of the foregoing embodiments, coating layer is, by volume, about 50% to about 90% of the oxygen scavenger phase and has an electrical conductivity of at least 70 Siemens per meter.

A method for fabricating an article according to an example of the present disclosure includes forming at least one coating layer on a substrate. The coating layer includes a silicate glass matrix, an oxygen scavenger phase dispersed through the silicate glass matrix, and at least one metal in metallic form.

In a further embodiment of any of the foregoing embodiments, the forming includes applying a slurry to the substrate. The slurry includes a liquid carrier and, dispersed in the liquid carrier, a silicate glass for forming the silicate glass matrix, an oxygen scavenger for forming the oxygen scavenger phase, and the at least one metal, followed by drying the slurry to at least remove the liquid carrier, and heat treating the slurry to form at least one coating layer.

In a further embodiment of any of the foregoing embodiments, the forming includes forming at least one coating layer to include a first coating layer and a different, second coating layer that is located between the first coating layer and the substrate. The first coating layer includes the silicate glass matrix and the oxygen scavenger phase, and the second coating layer includes at least one metal.

An article according to an example of the present disclosure includes a carbon-containing substrate and a multi-layer coating disposed on the carbon-containing substrate. The multi-layer coating includes a first coating layer and a different, second coating layer immediately adjacent the first coating layer between the carbon-containing substrate and the first coating layer. The first coating layer includes a silicate glass matrix and molybdenum disilicide dispersed through the silicate glass matrix, and the second coating layer includes at least one metal in metallic form.

In a further embodiment of any of the foregoing embodiments, the second coating layer includes a matrix, and at least one metal is dispersed through the matrix.

In a further embodiment of any of the foregoing embodiments, the one metal includes multiple different metals.

In a further embodiment of any of the foregoing embodiments, the second coating layer consists essentially of at least one metal.

In a further embodiment of any of the foregoing embodiments, the multi-layer coating includes a third coating layer that is located immediately adjacent the second coating layer between the second coating layer and the substrate. The third coating layer includes silicate glass.

In a further embodiment of any of the foregoing embodiments, the second coating layer, in addition to at least one metal, includes a reinforcement phase.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
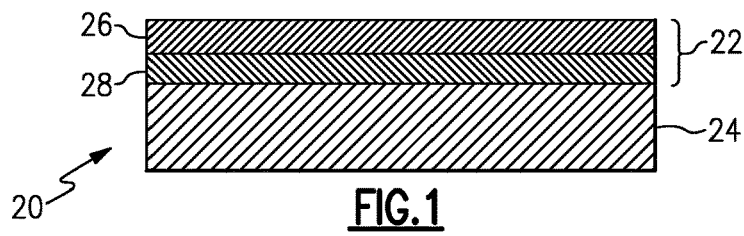
FIG. 1 illustrates an example article that has a multi-layer coating.

FIG. 1 schematically illustrates a representative portion of an example article 20. For example, although not limited, the article 20 may be a component, or portion thereof, of an aerospace vehicle, an engine, an electronic device, or other machine or device that is designed to be exposed to relatively severe environments. Such environments may include, but are not limited to, high temperature conditions, oxidation conditions, radiation conditions, or combinations of these conditions. In this regard, the article 20 includes a coating 22 that serves as an environmental barrier to protect an underlying substrate 24 from the environmental conditions.

In one example, the substrate 24 is a high temperature-resistant substrate. Example high temperature-resistant substrates can include, but are not limited to, metal substrates, metal alloy substrates, carbon-containing substrates, and glass-based and ceramic-based substrates. Metal or metal alloy substrates may include refractory metals and alloys, such as molybdenum-based alloys, nickel-based or cobalt-based superalloys, or intermetallic alloys, including but not limited to metal silicides and aluminides. Carbon-containing substrates may include carbon composites that include carbon fibers and/or carbon matrices, silicon carbide composites that include silicon carbide fibers and/or silicon carbide matrices, carbon composites that have silicon carbide surface coatings or silicon carbide conversion coatings, or composites with combinations of carbon and silicon carbide. As used herein, carbon refers to allotropes of carbon, such as but not limited to, graphite. Glass-based and ceramic-based substrates may include glass matrix composites, ceramic matrix composites, composites that have ceramic-based fibers, monolithic ceramics, and ultra-high temperature ceramics, such as refractory metal borides and carbides.

Although the substrate 24 may generally have good high temperature-resistance, depending on the material, the substrate 24 is potentially susceptible to the environmental conditions described above. The coating 22 serves to protect the substrate 24 from at least several types of environmental conditions, which will be described in further detail below.

In the illustrated example, the coating 22 is a multi-layer coating that includes a first coating layer 26 and a second coating layer 28. As shown, the first coating layer 26 is disposed on the substrate 24. The second coating layer 28 is between the first coating layer 26 and is immediately adjacent to, and contiguous with, both the first coating layer 26 and the substrate 24. Alternatively, additional layers could be provided between the substrate 24 and the second coating layer 28 and/or between the first coating layer 26 and the second coating layer 28.

Figure 2:
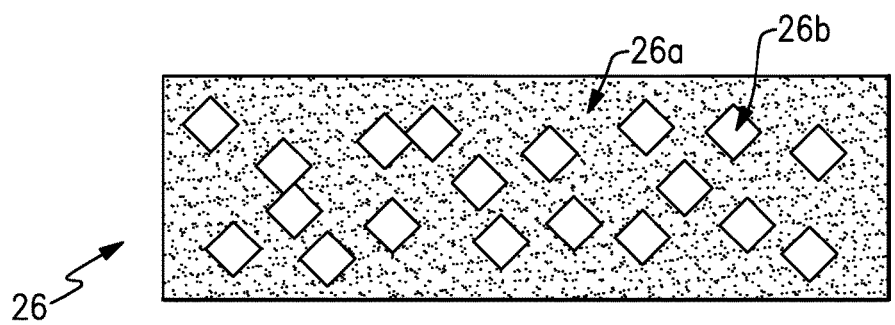
FIG. 2 illustrates a representative portion of a first coating layer of the multi-layer coating of FIG. 1.

FIG. 2 illustrates a representative portion of the first coating layer 26, which serves as an oxygen barrier to reduce oxygen infiltration into the second coating layer 28 and the substrate 24. The first coating layer 26 includes a silicate glass matrix 26a and an oxygen scavenger phase 26b dispersed through the silicate glass matrix 26a. The silicate glass matrix 26a may include silicate, or silicate and other elements or compounds. For example, the silicate glass matrix 26a includes sodium silicate, borosilicate, aluminosilicate, hafnium silicate, zirconium silicate, or mixtures thereof.

The oxygen scavenger phase 26b is a material, such as a compound, that preferentially reacts with oxygen to form a stable, non-volatile compound. For example, the oxygen scavenger phase 26b includes, but is not limited to, silicides, borides, or combinations thereof of one or more of aluminum, silicon, boron, molybdenum, tantalum, tungsten, platinum, nickel, cobalt, vanadium, niobium, rhenium, rhodium, indium, iridium, chromium, titanium, hafnium, zirconium, or yttrium. In a further example, the oxygen scavenger phase 26b is molybdenum disilicide. The oxygen scavenger phase 26b may be dispersed as discrete regions through the silicate glass matrix 26a or dispersed as a partially or fully interconnected network through the silicate glass matrix 26a.

Figure 3:
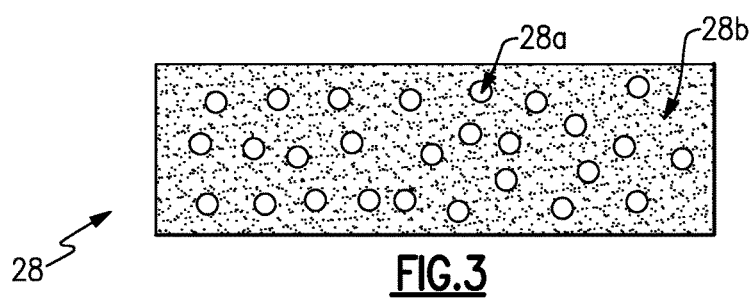
FIG. 3 illustrates a representative portion of a second coating layer of the multi-layer coating of FIG. 1.

FIG. 3 illustrates a representative portion of the second coating layer 28, which serves as a radiation barrier to at least partially reflect incident radiation, such as infrared radiation, laser radiation, visible light radiation, electromagnetic radiation, or the like. The second coating layer 28 includes at least one metal 28a in metallic form. The term "metallic form" refers to a metallically bonded metal, rather than a metal that is ionically or covalently bonded to non-metal atoms in compounds. For example, the metal 28a is copper, aluminum, silver, nickel, platinum, silicon, cobalt, niobium, molybdenum, tantalum, tungsten, rhenium, titanium, vanadium, chromium, zirconium, hafnium, ruthenium, rhodium, indium, osmium, iridium, or a combination thereof. In one example, the metal 28a includes only a single one of the example metals. In another example, the metal 28a includes multiple metals of the example metals. The multiple metals may be intermetallic or alloys of the metals. Alternatively or additionally, the multiple metals may be separate and discrete from each other, such as particles of one of the metals and particles of another of the metals.

In the illustrated example, the second coating layer 28 is a composite layer and includes the metal 28a dispersed in a glass matrix 28b. For instance, the second coating layer 28 has, by volume, from about 1% to about 90% of the metal 28a. In a further example, the second coating layer 28 has, by volume, from about 30% or about 60% to about 90% of the metal 28a. The glass matrix 28b serves to thermally and environmentally protect the metal 28a from oxidation or other reactions that may reduce the function of the metal 28a as a radiation barrier. As examples, the glass matrix 28b is selected from the same example compositions as the silicate glass matrix 26a of the first coating layer 26. In a further example, the second coating layer 28 may also include an oxygen scavenger phase as described above. Alternatively, the second coating layer 28 excludes a glass matrix and is formed essentially or only of the metal 28a.

The coating 22 serves as a multi-functional environmental barrier for the substrate 24. The first coating layer 26 serves as an oxygen barrier, to protect the second coating layer 28 and the substrate 24 from oxidation. Additionally, the first coating layer 26 may be electrically conductive and thus also serve as an electromagnetic shield to the second coating layer 28 and the substrate 24. For instance, the oxygen scavenger phase 26b is electrically conductive. In one example, the first coating layer 26 has, by volume, about 50% to about 80% of the oxygen scavenger phase 26b and has an electrical conductivity of at least 70 Siemens per meter (S/m). The remainder of the first coating layer 26 is composed of the silicate glass matrix 26a and, optionally, other constituents. In one example, the first coating layer 26 has, by volume, about 50% to about 80% of the oxygen scavenger phase 26b, about 1% to about 30% of the silicate glass matrix 26a, and about 1% to about 30% of silica.

While the first coating layer 26 enhances oxidation resistance and potentially electromagnetic shielding, the second coating layer 28 serves to enhance radiation resistance. The first coating layer 26 may be transparent or translucent to incident radiation, but the underlying second coating layer 28 at least partially reflects incident radiation to thus further protect the substrate 24. Such radiation may include, but is not limited to, infrared radiation, laser radiation, visible light radiation, electromagnetic radiation, and the like. The first coating layer 26 enhances durability of the metal 28a by protecting the metal 28a from oxidation, which may otherwise decrease reflectivity of the metal 28a.

Figure 4:
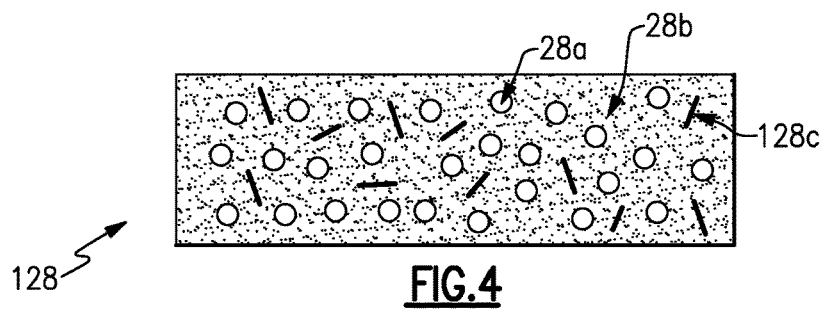
FIG. 4 illustrates another example of a coating layer that additionally includes a reinforcement phase.

The second coating layer 28 can include additional constituents or additives to further enhance functionality. For example, FIG. 4 illustrates another example of a second coating layer 128. In this disclosure, like reference numerals designate like elements where appropriate and reference numerals with the addition of one-hundred or multiples thereof designate modified elements that are understood to incorporate the same features and benefits of the corresponding elements. The second coating layer 128 is similar to the second coating layer 28 but additionally includes a reinforcement phase 128c. For example, the reinforcement phase is a particulate phase, a platelet phase, a fiber phase, or mixtures thereof that may enhance the strength of the second coating layer 128. In one example, the reinforcement phase 128c includes carbon nanotubes.

Figure 5:
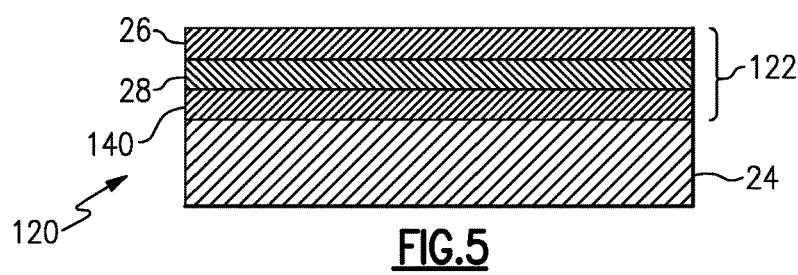
FIG. 5 illustrates another example article with a multi-layer coating that additionally includes a third coating layer.

FIG. 5 illustrates another example of an article 120 that is similar to the article 20 but additionally includes a third coating layer 140. In this example, the third coating layer 140 is located between the second coating layer 28 and the substrate 24 and is immediately adjacent to, and contiguous with, both the second coating layer 28 and the substrate 24. Alternatively, additional layers could be provided between the substrate 24 and the third coating layer 140 and/or between the second coating layer 28 and the third coating layer 140. As an example, the third coating layer 140 includes silicate glass. For instance, the silicate glass may include silicate, or silicate and other elements or compounds. For example, the silicate glass includes sodium silicate, borosilicate, hafnium silicate, zirconium silicate, or mixtures thereof. In further examples, the third coating layer 140 also includes an oxygen scavenger phase. The oxygen scavenger phase includes, but is not limited to, silicides, borides, or combinations thereof of one or more of aluminum, silicon, boron, molybdenum, tantalum, tungsten, platinum, nickel, cobalt, vanadium, niobium, rhenium, rhodium, indium, iridium, chromium, titanium, hafnium, zirconium, or yttrium. In a further example, the oxygen scavenger phase is molybdenum disilicide. In a further example, the third coating layer 140 has the same composition as the first coating layer 26.

Figure 6:
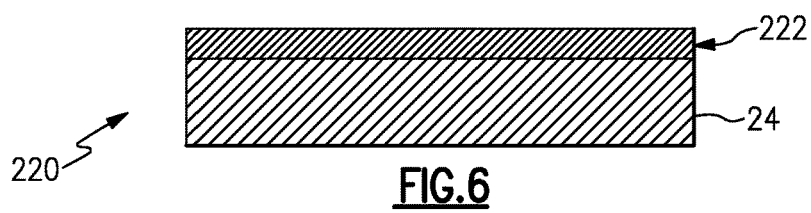
FIG. 6 illustrates another example article that includes a single coating layer with a silicate glass matrix, an oxygen scavenger phase, and one or more metals.
Figure 7:
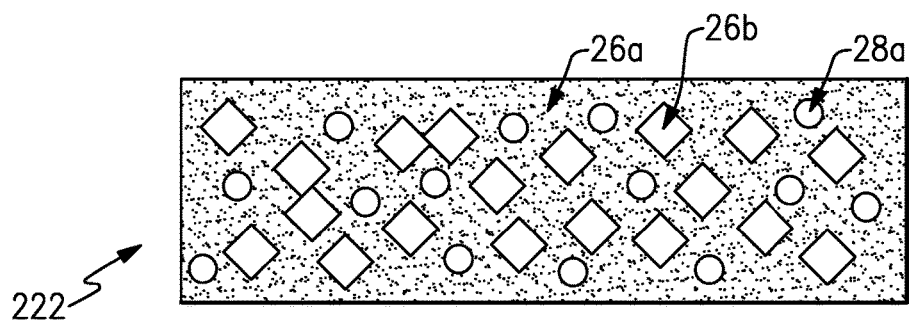
FIG. 7 illustrates the coating layer of FIG. 6.

FIG. 6 illustrates another example of an article 220. In the article 220, rather than the separate coating layers 26/28 as in the article 20/120, the silicate glass matrix 26a, the oxygen scavenger phase 26b, and the metal 28a are incorporated into a single coating layer 222. In the illustrated example, the coating layer 222 is immediately adjacent to and contiguous with the substrate 24. Alternatively, additional layers could be provided between the substrate 24 and the coating layer 222. FIG. 7 illustrates a representative portion of the coating layer 222. The coating layer includes the silicate glass matrix 26a, the oxygen scavenger phase 26b dispersed in the silicate glass matrix 26a, and the one or more metals 28a also dispersed in the silicate glass matrix 26a. In further examples, the coating layer 222 may be used with any of the other coating layers described herein. In one example, the coating layer 222 has, by volume, about 50% to about 90% of the oxygen scavenger phase 26b, about 1% to about 30% of the silicate glass matrix 26a, about 1% to about 30% of the metal 28a, and, optionally, a remainder of other additives or constituents such as silica. The silica may be used in an amount from about 1% to about 30%.

The article 20/120/220 can be fabricated by forming at least one coating layer 22/122/222 on the substrate 24, where the at least one coating layer 22/122/222 includes the silicate glass matrix 26a, the oxygen scavenger phase 26b dispersed through the silicate glass matrix 26a, and at least one metal 28a in metallic form. For the separate first coating layer 26 and second coating layer 28, the second coating layer 28 is first deposited on the substrate 24. For instance, if the second coating layer 28 is primarily or only the metal 28a, the metal 28a can be deposited onto the substrate 24 by a technique such as, but not limited to, physical vapor deposition, chemical vapor deposition, pack cementation, atomic layer deposition, thermal or cold spray processes, cathodic arc deposition, slurry coating, or directed energy methods such as arc, laser, or electron beam deposition using powder or wire feedstock. If the second coating layer 28 includes the metal 28a dispersed in the glass matrix 28b, the second coating layer 28 may be fabricated using a slurry processing technique that is similar to the fabrication of the first coating layer 26, discussed in further detail below or a thermal spray process.

The first coating layer 26, the third coating layer 140, the coating layer 222, and optionally the second coating layer 28/128, can be fabricated using slurry processing. For instance, a slurry is prepared or provided that includes a liquid carrier. A silicate glass is dispersed in the liquid carrier. Depending on which layer 26, 28/128, 140, or 222 is being formed, the silicate glass will form the silicate glass matrix 26a or the glass matrix 28b. The slurry may also include an oxygen scavenger for forming the oxygen scavenger phase 26b in the first coating layer 26, the third coating layer 140, or the coating layer 222. If the slurry is for forming the second coating layer 28 and the second coating layer 28 is not to include any oxygen scavenger phase 26b, the oxygen scavenger is excluded from the slurry. For the second coating layer 28/128, or for the coating layer 222, the slurry additionally includes the metal or metals 28a, and optionally the reinforcement phase 128c. The silicate glass and metal 28a are provided as particulate powders in the carrier liquid. The carrier liquid is not particularly limited and may be, but is not limited to, organic liquids. The slurry may also include other additives, such as binders and dispersants.

The slurry is applied to the substrate 24 by, but not limited to, dipping, spraying, brushing, or the like. After application, the slurry is dried either through natural evaporation of the liquid carrier at ambient temperature or by exposure to elevated processing temperatures, to remove the liquid carrier. Separately or in conjunction with drying, the slurry may be heat treated to cure the slurry. For instance, if a binder is used, the curing cross-links the binder to enhance the "green" strength of the intermediate coating. An example binder includes colloidal silica. For instance, although not limited, the curing may be conducted at a temperature of about 150° C. to about 200° C. A typical curing time would be about 15 minutes, but shorter or longer times may also be used. Before or after curing, additional slurry may be applied to build-up the layer to the desired thickness.

Separately or in conjunction with the drying and/or curing, the slurry (i.e., intermediate coating) is heat treated under an inert cover gas, such as argon or helium, to consolidate the silicate glass and thus form the final coating layer 26, 28, 140, or 222. Although not limited, the final coating layers 26, 28/128, 140, and 222 may have an independent thickness of about 50 micrometers to about 200 micrometers. Although not limited, the heat treating may be conducted at a temperature of about 1150° C. The selected temperature may vary according to the composition of the silicate glass. A typical heat treating time would be about one hour, but shorter or longer times may also be used. Additionally, although the coating layer 26 or 222 is typically the outermost, exposed layer, the examples herein may also include a further topcoat layer over the layer 26 or 222. The topcoat layer could be any of the layers described herein or other types of layer, such as but not limited to, oxides, borides, carbides, silicides, silicates, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
    a substrate;
    at least one coating layer disposed on the substrate, the at least one coating layer including:
        a silicate glass matrix,
        an oxygen scavenger phase dispersed through the silicate glass matrix, and
        at least one metal in metallic form that is dispersed in a matrix.

2. The article as recited in claim 1, wherein the oxygen scavenger phase includes molybdenum disilicide.

3. The article as recited in claim 1, wherein the oxygen scavenger phase includes at least one boride or silicide of an element selected from the group consisting of aluminum, tantalum, tungsten, platinum, nickel, cobalt, vanadium, niobium, rhenium, rhodium, indium, iridium, chromium, titanium, hafnium, zirconium, yttrium, and combinations thereof.

4. The article as recited in claim 1, wherein the at least one metal is selected from the group consisting of copper, aluminum, silver, nickel, and combinations thereof.

5. The article as recited in claim 1, wherein the at least one metal is selected from the group consisting of platinum, silicon, cobalt, niobium, molybdenum, tantalum, tungsten, rhenium, titanium, vanadium, chromium, zirconium, hafnium, ruthenium, rhodium, indium, osmium, iridium, and combinations thereof.

6. The article as recited in claim 1, wherein the at least one coating layer includes a first coating layer and a different, second coating layer that is located between the first coating layer and the substrate, the first coating layer including the silicate glass matrix and the oxygen scavenger phase, and the second coating layer including the at least one metal and the matrix.

7. The article as recited in claim 6, wherein the at least one metal includes multiple different metals.

8. The article as recited in claim 6, wherein the at least one coating layer includes a third coating layer that is located between the second coating layer and the substrate, the third coating layer including silicate glass.

9. The article as recited in claim 6, wherein the second coating layer, in addition to the at least one metal phase, includes a reinforcement phase.

10. The article as recited in claim 1, wherein the at least one coating layer is, by volume, about 50% to about 90% of the oxygen scavenger phase and has an electrical conductivity of at least 70 Siemens per meter.

11. A method for fabricating an article, the method comprising:
    forming at least one coating layer on a substrate, the at least one coating layer including:
        a silicate glass matrix,
        an oxygen scavenger phase dispersed through the silicate glass matrix, and
        at least one metal in metallic form that is dispersed in a matrix.

12. The method as recited in claim 11, wherein the forming includes applying a slurry to the substrate, the slurry includes a liquid carrier and, dispersed in the liquid carrier, a silicate glass for forming the silicate glass matrix, an oxygen scavenger for forming the oxygen scavenger phase, and the at least one metal, followed by drying the slurry to at least remove the liquid carrier, and heat treating the slurry to form the at least one coating layer.

13. The method as recited in claim 11, wherein the forming includes forming the at least one coating layer to include a first coating layer and a different, second coating layer that is located between the first coating layer and the substrate, the first coating layer including the silicate glass matrix and the oxygen scavenger phase, and the second coating layer including the at least one metal and the matrix.

14. An article comprising:
    a substrate; and
    a multi-layer coating disposed on the substrate, the multi-layer coating including a first coating layer and a different, second coating layer immediately adjacent the first coating layer between the substrate and the first coating layer, the first coating layer including a silicate glass matrix and molybdenum disilicide dispersed through the silicate glass matrix, and the second coating layer including at least one metal in metallic form that is dispersed in a matrix.

15. The article as recited in claim 14, wherein the at least one metal includes multiple different metals.

16. The article as recited in claim 14, wherein the multi-layer coating includes a third coating layer that is located immediately adjacent the second coating layer between the second coating layer and the substrate, the third coating layer including silicate glass.

17. The article as recited in claim 14, wherein the second coating layer, in addition to the at least one metal, includes a reinforcement phase.

* * * * *